United States Patent [19]

Eckle

[11] 4,163,624
[45] Aug. 7, 1979

[54] TOOLHOLDER FOR RECESSING OPERATIONS, IN PARTICULAR A BORING BAR

[75] Inventor: Otto Eckle, Löchgau, Fed. Rep. of Germany

[73] Assignee: Komet Stahlhalter- und Werkzeugfabrik Robert Breuning GmbH, Besigheim, Fed. Rep. of Germany

[21] Appl. No.: 871,553

[22] Filed: Jan. 23, 1978

[30] Foreign Application Priority Data

Feb. 9, 1977 [DE] Germany .............................. 7703785

[51] Int. Cl.² .............................................. B23B 29/02
[52] U.S. Cl. .................... 408/185; 407/43; 407/45; 407/46; 407/87
[58] Field of Search ............... 408/185, 184, 181, 146, 408/147, 153; 407/37, 40, 43, 70, 71, 101, 45, 46, 73, 87, 47

[56] References Cited

U.S. PATENT DOCUMENTS

| 1,237,185 | 8/1917 | Ewen | 408/181 |
| 3,309,946 | 3/1967 | Thomas | 408/153 |
| 3,323,193 | 6/1967 | Greenleaf | 407/101 |
| 4,018,542 | 4/1977 | Lindsay | 408/153 |
| 4,043,696 | 8/1977 | Wohlhaupter | 408/185 |

FOREIGN PATENT DOCUMENTS

885335  8/1953  Fed. Rep. of Germany ........... 408/181
539539  9/1941  United Kingdom ..................... 408/185

Primary Examiner—Leonidas Vlachos
Attorney, Agent, or Firm—Blanchard, Flynn, Thiel, Boutell & Tanis

[57] ABSTRACT

A toolholder for recessing operations having at least one recessing tool having a cutting body of hard metal, the recessing tool being arranged in a cylindrical receiving bore in the toolholder and being held by a retaining screw arranged in the toolholder perpendicularly to the receiving bore. A tool support is arranged in the receiving bore and has a semi-cylindrical shank. The flat surface on the semi-cylindrical shank has at least one groove extending parallel to its axis for receiving an exchangeable cutting body slidably mounted in the groove. A clamping jaw for each cutting body is provided in the other remaining half of the receiving bore and, under the action of the remaining screw, is supported at its front, outer end on the top of the cutting body and by its rear end on the supporting surface of the tool support. The clamping jaw has at its front end a shoulder supporting the cutting body in the direction of sliding and is provided with a setscrew extending parallel to the groove. The rear end of the setscrew is supported on the base of the receiving bore. The front end of the setscrew is accessible through a bore opening out in the outer end face of the clamping jaw.

10 Claims, 4 Drawing Figures

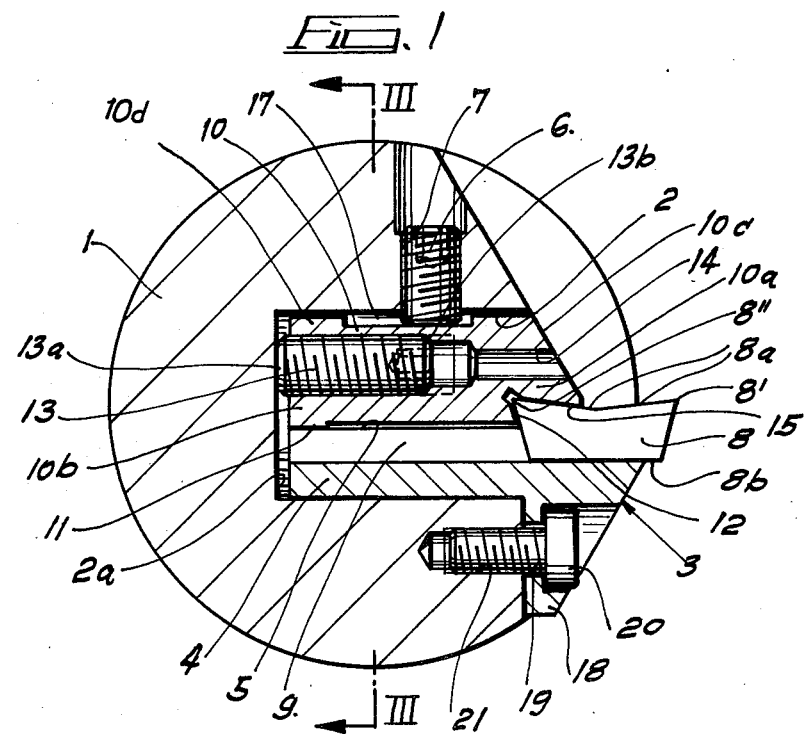
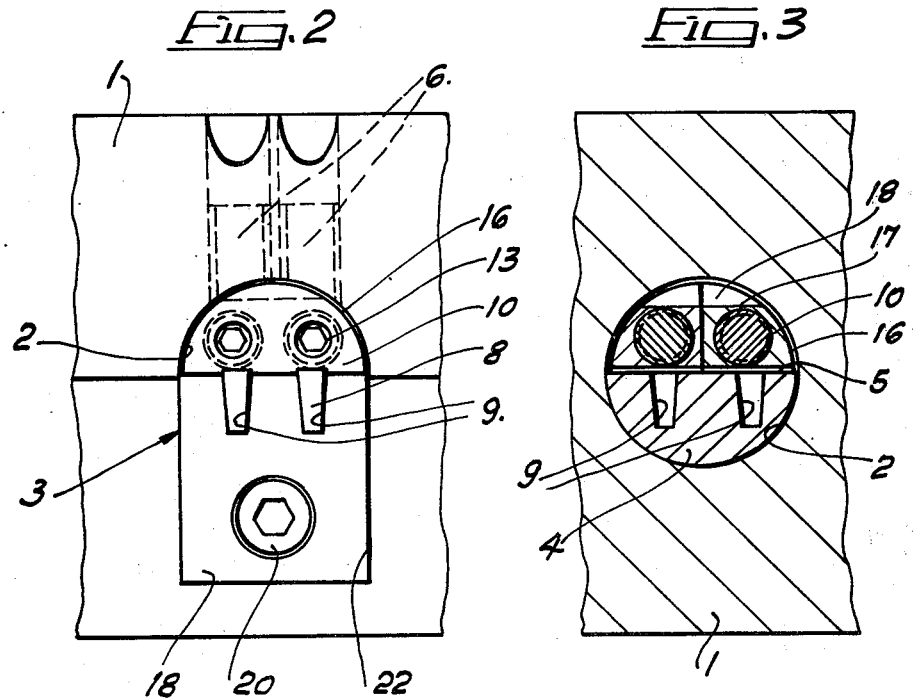

TOOLHOLDER FOR RECESSING OPERATIONS, IN PARTICULAR A BORING BAR

FIELD OF THE INVENTION

The invention relates to a toolholder for recessing operations, in particular a boring bar, equipped with at least one recessing tool having a cutting body of hard metal, the recessing tool being arranged in a cylindrical receiving bore in the toolholder and being held by a retaining screw arranged in the toolholder perpendicularly to the receiving bore.

BACKGROUND OF THE INVENTION

In a known boring bar of this kind, the cutting body of hard metal is brazed onto a tapered extension of the shank of the recessing tool. The shank may either be of cylindrical form and then be arranged in a cylindrical receiving bore, or, and this is more frequently the case, it has a square cross-section and is arranged in a receiving bore of square cross-section. The square cross-section is chosen in order to avoid turning movements of the recessing tool in the receiving bore. A retaining screw acting directly on the shank serves to hold the recessing tool in the receiving bore. Adjusting devices of any kind for adjusting the recessing tool in the radial direction are generally not provided on boring bars. The recessing tools with a brazed-on cutting body which are usually employed with boring bars have the disadvantage that they lose precision of profile as a result of the regrinding that is frequently required. Because of this, not only is it necessary to fall back on keeping a large stock, but regrinding equipment also has to be procured and maintained. Since the recessing tools employed with boring bars generally have a square shank, it is also not possible for the user of these recessing tools to make a toolholder or boring bar for himself. Moreover, two recessing tools cannot be arranged closely side by side in the known construction, since for reasons of stability their shanks must not fall below a certain cross-section. The arrangement of two recessing tools close beside one another is necessary, however, when it is desired to make two grooves simultaneously in a bore, for example two Seeger ring recesses in front and at the back of a ball bearing or some other machine element. The known method of mounting and securing recessing tools in boring bars and other toolholders is also not possible for up-to-date production on machining centres and numerically controlled machines, or on special machines and multi-station machines, since such machines postulate tools which can be produced as simply and rapidly as possible, are adjustable or settable and resettable and can be combined easily with other tools.

The problem underlying the invention is to provide a toolholder for recessing operations, in particular a boring bar of the kind mentioned at the beginning, wherein the cutting body is held in the boring bar so that it is exchangeable and radially adjustable and wherein, moreover, a plurality of cutting bodies can be arranged closely side by side, the parts for receiving and holding the cutting bodies having structural dimensions which are as small as possible and the receiving bore in the toolholder or boring bar being simple to produce.

According to the invention, this is achieved in that the receiving bore is formed as a blind bore that in the blind bore there is arranged a tool support with a substantially semi-cylindrical shank having in its plane supporting surface facing the retaining screw at least one groove extending parallel to its axis for receiving an exchangeable cutting body slidably mounted in the groove, that a clamping jaw for each cutting body is provided in the other remaining half of the blind bore and, under the action of the retaining screw, is supported by its front, outer, end on the top of the cutting body and by its rear end on the supporting surface of the tool support, and that the clamping jaw has at its front end a shoulder supporting the cutting body in the direction of sliding and is provided with a setscrew extending parallel to the groove, the rear end of the setscrew being supported on the base of the blind bore and its front end being accessible through a bore opening out in the outer end face of the clamping jaw.

The novel nature of the arrangement and fixing of recessing cutting bodies requires only a comparatively small space, so that it is particularly suitable for boring bars. For example, to accommodate two cutting bodies, which may be arranged closely side by side at any desired distance apart, only one blind bore with a diameter of 16 mm and a depth of about 30 mm is necessary. The blind bore and the threads for receiving the retaining screws can be produced with simple means, so that the user of such toolholders and boring bars can even produce these himself. Since the cutting body is exchangeable, regrinding operations and the inaccuracies associated therewith are eliminated. Moreover, the cutting body or bodies is or are conveniently and accurately adjustable in the longitudinal direction by means of externally accessible setscrews. This is an advantage in particular when there is to be provided on one toolholder a plurality of cutting bodies whose cutting edges must be positioned precisely with respect to the toolholder. In the supporting surface of the tool support there may be provided one, two or even three grooves with different distances between them and of different widths, in which the appropriate cutting bodies are then arranged. In this way, the toolholder can be adapted to the most diverse machining tasks. It is envisaged that the tool support, the cutting bodies and the clamping jaws, the production of which requires a certain precision, will be made in a tool factory specialised for the purpose, while the toolholder or boring bar itself can be made by the user of the tools. Of course, it is also possible for the toolholder or boring bar to be made by the tool factory together with the other parts.

BRIEF DESCRIPTION OF THE DRAWING

The invention will be described in detail hereinafter with reference to embodiments shown in the drawing.

In the drawing:

FIG. 1 is a cross-section through a boring bar enlarged to about twice its size;

FIG. 2 is a partial side view of the boring bar;

FIG. 3 is a partial longitudinal section on the line III—III of FIG. 1;

DETAILED DESCRIPTION

Figure 4:
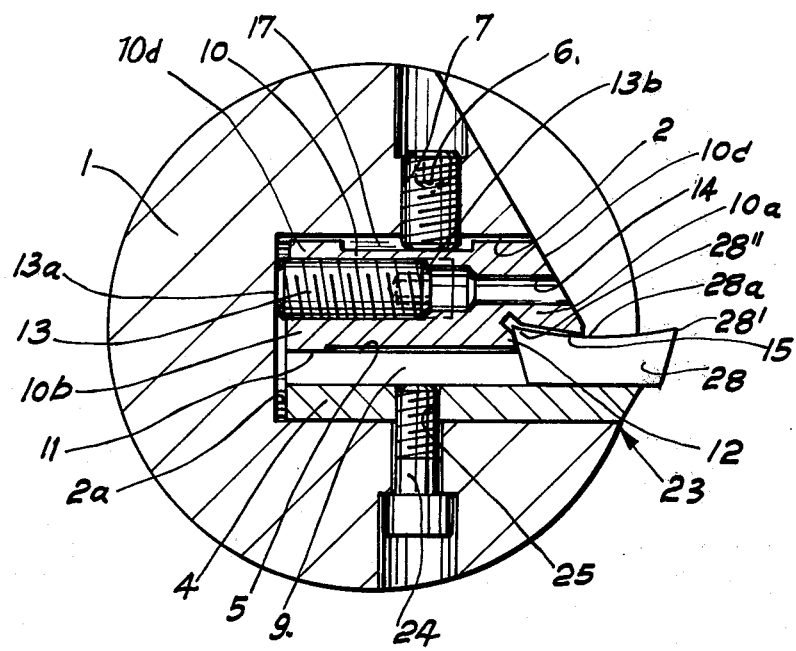
FIG. 4 is a cross section through a second embodiment

The invention is illustrated in the drawing on the basis of a toolholder in the form of a boring bar. The boring bar 1 has a cylindrical cross-section. In the desired position it has a radially extending blind bore 2. In the blind bore 2 there is arranged a tool support 3 with a substantially semi-cylindrical shank 4 having a plane supporting surface 5. This supporting surface 5 is arranged opposite a retaining screw 6 which can be screwed tight in a thread 7 in the boring bar 1. The thread 7 extends perpendicularly to the axis of the blind bore 2. Since two cutting bodies 8 are provided on the common tool support 3 in the embodiment illustrated, two retaining screws 6 arranged parallel to one another are accordingly also provided, as can be seen from FIG. 2.

The tool support 3 has in its supporting surface 5 two grooves 9 extending parallel to the axis of the blind bore 2 and of the shank 4, the grooves being advantageously of trapezoidal cross-section. Instead of two grooves, more grooves or even only one groove may also be arranged in the tool support 3. In each of the grooves 9 there is arranged a cutting body 8, the cross-section of which is matched to the cross-section of the groove 9 and accordingly is also of trapezoidal form. The cutting body 8 is slidable in the groove 9 in its longitudinal direction and is exchangeable.

A clamping jaw 10 is provided for each cutting body 8 in the other remaining half of the blind bore 2 and is supported by its front, outer, end 10a on the top 8a of the cutting body 8 under the action of the retaining screw 6. At its rear end 10b the clamping jaw 10 has a downwardly projecting shoulder 11 which is supported on the supporting surface 5. Moreover, at its front end 10a, the clamping jaw 10 has a shoulder 12 engaging the rear of the cutting body 8 and supporting it in the direction of sliding. Moreover, a setscrew 13 extending parallel to the groove 9 can be turned in each clamping jaw 10, the rear end 13a of the setscrew being supported on the base 2a of the blind bore 2 and its front end 13b being accessible through a bore 14 opening out in the outer end face 10c of the clamping jaw 10.

A hexagonal recess spanner can be introduced through this bore 14 and the setscrew 13 can be so turned that the clamping jaw 10 moves radially outwards. This takes place with the retaining screw 6 lightly tightened. In the process, the shoulder 12 carries the cutting body 8 along. As soon as its operative cutting edge 8' disposed on the outside has reached the desired position, the retaining screw 6 is securely tightened. The second cutting body 8 can be adjusted in a similar manner independently of the first cutting body, so that it is possible to bring the two cutting bodies 8 to exactly the same radial position or else to radially different positions, if different recessing depths are desired. It is possible to accommodate not only two grooves, but also one groove or three grooves, in the tool support 3, a corresponding number of clamping jaws being then provided. Moreover, it is also possible at the same time for the distance between the grooves to be different and for the grooves also to have profiles of different widths, if cutting bodies of different widths are to be employed. Since the cutting bodies can be set exactly, a very high working accuracy is achieved.

Advantageously, the facing surface 15 of the clamping jaw 10 supported on the top 8a of the cutting body 8 encloses with the groove 9 an angle opening towards the base 2a of the blind bore and that part of the top 8a of the cutting body which co-operates with the facing surface 15 is inclined at the same angle with respect to the base surface 8b of the cutting body 8. In this way the result is obtained that with a pressure on the clamping jaw 10 the cutting body 8 is always brought into abutment with the shoulder 12, so that there is no play between the shoulder 12 and the cutting body. This promotes working accuracy. Moreover, it is also ensured that the cutting body 8 does not drop out unintentionally when the retaining screw 6 is slackened.

So that the exchangeable cutting body 8 can be used as long as possible, it has cutting edges 8' and 8" at its two ends and, as can be seen in FIG. 1, its top 8a extends in the form of a V in side view. The angle between the two parts of the top 8a is about 160°. The facing surface or counter-face 15 is inclined correspondingly with respect to the groove 9. If the operative cutting edge 8' disposed on the outside is worn out, the retaining screw 6 is loosened to a fairly large extent and the cutting body can then be drawn out radially. It is then turned through 180° and the new cutting edge 8" thereupon comes into use.

So that the clamping jaws 10 may have as great a stability as possible, their surface 16 turned away from the supporting surface 5 of the tool support 3 is adapted to the radius of the blind bore 2. Taken together, the two clamping jaws have the form of a half cylinder. If only one clamping jaw is provided, this has the cross-section of a half cylinder, while in the case of three clamping jaws their cross-sections complement each other to form a half cylinder.

In order to ensure secure support of the retaining screw 6 on the clamping jaw 10, the clamping jaw 10 has on its side remote from the supporting surface 5 a plane pressure surface 17 at the rear end of which a projection 10d is provided. The projection 10d prevents the clamping jaw coming out of the blind bore 2 when the retaining screw 6 is loosened.

The tool support 3 advantageously has at the front end of its semi-cylindrical shank 4 a retaining part 18 projecting on that side of the shank 4 which is remote from the supporting surface 5, a bore 19 for a fixing screw 20 being provided in the retaining part. This fixing screw 20 engages a thread 21 in the boring bar 1 extending parallel to the axis of the blind bore 2. The retaining part 18 and the fixing screw 20 not only prevent the tool support 3 dropping out of the blind bore 2, but they also prevent it turning in the blind bore. Moreover, additional support of the tool support 3 is obtained precisely in the heavily loaded outer, front part.

Advantageously, the retaining part 18 has a rectangular cross-section (FIG. 2) and engages in a corresponding recess 22 in the boring bar 1 or toolholder. This recess can be produced in simple manner by milling a suitable groove in the boring bar. It serves to secure the tool support 3 additionally against turning.

The embodiment shown in FIG. 4 has substantially the same design as the embodiment according to FIGS. 1 to 3, for which reason the same references have moreover been used. In the toolholder shown in FIG. 4, however, the top 28a of the cutting body 28, which has cutting edges 28', 28" at both ends, is curved substantially in the form of a circular arc in side view. A fixing screw 24 is provided for fixing the tool support 23, the fixing screw extending perpendicularly to the direction of the axis of the tool support 23 and being screwed into a thread 25 therein.

The embodiments of the invention in which an exclusive property or privilege is claimed are defined as follows:

1. In a toolholder for recessing operations, in particular a boring bar, equipped with at least one recessing tool having a cutting body of hard metal, the recessing tool being arranged in a cylindrical receiving bore in the toolholder and being held by a retaining screw arranged in the toolholder perpendicularly to the receiving bore, comprising the improvement wherein the receiving bore is formed as a blind bore, wherein in the blind bore there is arranged a tool support with a substantially semi-cylindrical shank having in its plane supporting surface facing the retaining screw at least one groove extending parallel to its axis for receiving an exchangeable cutting body slidably mounted in the groove, wherein a clamping jaw for each cutting body is provided in the other remaining half of the blind bore and, under the action of the retaining screw, is supported by its front, outer, end on the top of the cutting body and by its rear end on the supporting surface of the tool support, and wherein the clamping jaw has at its front end a shoulder supporting the cutting body in the direction of sliding and is provided with a setscrew extending parallel to the groove, the rear end of the setscrew being supported on the base of the blind bore and its front end being accessible through a bore opening out in the outer end face of the clamping jaw.

2. The improved toolholder according to claim 1, wherein the facing surface of the clamping jaw supported on the top of the cutting body encloses with the groove an angle opening towards the base of the blind bore and wherein part of the top of the cutting body which co-operates with the facing surface is inclined at the same angle with respect to the base surface of the cutting body.

3. The improved toolholder according to claim 2, wherein the cutting body has cutting edges at both ends and the top of the cutting body extends in the form of a V in side view.

4. The improved toolholder according to claim 3, wherein the angle between the two parts of the top is about 160°.

5. The improved toolholder according to claim 1, wherein that surface of the clamping jaw which is turned away from the supporting surface of the tool support is adapted to the radius of the blind bore.

6. The improved toolholder according to claim 1, wherein the clamping jaw has on its side remote from the supporting surface a plane pressure surface for engagement by the retaining screw and a projection is provided at the rear end of the pressure surface.

7. The improved toolholder according to claim 1, wherein the tool support has at the front end of its semi-cylindrical shank a retaining part projecting on that side of the shank which is remote from the supporting surface, a bore for a fixing screw engaging a thread in the toolholder extending parallel to the axis of the blind bore being provided in the retaining part.

8. The improved toolholder according to claim 2, wherein the retaining part has a rectangular cross-section and engages in a corresponding recess in the toolholder.

9. The improved toolholder according to claim 1, wherein the groove for receiving the cutting body has a trapezoidal cross-section widening towards the supporting surface and the cutting body has the same cross-section.

10. The improved toolholder according to claim 1, wherein the facing surface of the clamping jaw supported on the top of the cutting body encloses with the groove an angle opening towards the base of the blind bore, the cutting body has cutting edges at both ends, and the top of the cutting body is curved substantially in the form of a circular arc in side view.

* * * * *